(12) United States Patent
Carr

(10) Patent No.: US 6,725,596 B2
(45) Date of Patent: Apr. 27, 2004

(54) FISHING LINE WITH ENHANCED PROPERTIES

(75) Inventor: Ronald H. Carr, Plum Boro, PA (US)

(73) Assignee: Ferrari Importing Co., Pittsburgh, PA (US)

(*) Notice: Subject to any disclaimer, the term of this patent is extended or adjusted under 35 U.S.C. 154(b) by 0 days.

(21) Appl. No.: 10/071,593

(22) Filed: Feb. 8, 2002

(65) Prior Publication Data

US 2002/0104252 A1 Aug. 8, 2002

Related U.S. Application Data

(60) Provisional application No. 60/267,311, filed on Feb. 8, 2001.

(51) Int. Cl.$^7$ .................................................. A01K 91/00
(52) U.S. Cl. ...................... 43/44.98; 428/364; 428/394; 428/395
(58) Field of Search ........................ 43/44.98; 428/364, 428/394, 395, 375

(56) References Cited

U.S. PATENT DOCUMENTS

| | | | | |
|---|---|---|---|---|
| 3,057,040 A | * | 10/1962 | Cuculo | 43/44.98 |
| 4,183,200 A | | 1/1980 | Bajaj | 57/234 |
| 4,302,556 A | * | 11/1981 | Endo et al. | 525/199 |
| 4,339,499 A | * | 7/1982 | Tappe et al. | 428/394 |
| 4,353,960 A | * | 10/1982 | Endo et al. | 428/395 |
| 4,382,358 A | * | 5/1983 | Tappe et al. | 428/394 |
| 4,459,337 A | * | 7/1984 | Hansen | 43/44.98 |
| 4,521,483 A | * | 6/1985 | Sasaki et al. | 428/375 |
| 4,546,158 A | * | 10/1985 | Mizuno et al. | 428/364 |
| 4,606,144 A | * | 8/1986 | Sasaki et al. | 43/44.98 |
| 4,629,654 A | * | 12/1986 | Sasaki et al. | 428/394 |
| 4,667,001 A | * | 5/1987 | Mizuno | 526/255 |
| 5,066,755 A | * | 11/1991 | Lemstra | 428/364 |
| 5,303,498 A | * | 4/1994 | Yutori et al. | 43/44.98 |
| 5,540,990 A | * | 7/1996 | Cook | 43/44.98 |
| 5,562,987 A | * | 10/1996 | Shimizu | 428/394 |
| 5,658,663 A | * | 8/1997 | Mizuno et al. | 428/394 |
| 5,722,106 A | * | 3/1998 | Masterman et al. | 428/364 |
| 5,753,366 A | * | 5/1998 | Koike | 428/395 |
| 5,843,574 A | * | 12/1998 | Suryadevara et al. | 428/395 |
| 5,845,430 A | * | 12/1998 | Nakano et al. | 43/44.98 |
| 6,132,869 A | * | 10/2000 | Ohira et al. | 43/44.98 |
| 6,497,952 B1 | * | 12/2002 | Ohkoshi et al. | 428/364 |

FOREIGN PATENT DOCUMENTS

| | | | |
|---|---|---|---|
| EP | 725170 B1 | * | 8/1996 |
| JP | 60-181314 B1 | * | 9/1985 |
| JP | 60-209008 B1 | * | 10/1985 |
| JP | 60-209009 B1 | * | 10/1985 |
| JP | 4-136212 B1 | * | 5/1992 |
| JP | 6-217668 B1 | * | 8/1994 |
| JP | 7-54211 B1 | * | 2/1995 |
| JP | 7-143834 B1 | * | 6/1995 |
| JP | 10-18127 B1 | * | 1/1998 |
| JP | 10-298825 B1 | * | 11/1998 |
| JP | 2000-192327 B1 | * | 7/2000 |
| JP | 2001-81629 B1 | * | 3/2001 |

\* cited by examiner

*Primary Examiner*—Darren W. Ark
(74) *Attorney, Agent, or Firm*—Michael R. Swartz

(57) ABSTRACT

An enhanced fishing line has a unique combination of breaking strength and elongation properties to provide a high level of flexibility, a high ultimate knot breaking strength, and a high level of breaking toughness that is defined as the actual work per unit volume of material required to break the material. The line is a monofilament construction made of a synthetic polymeric material such as a polyamide, polyester, polyethylene, or fluropolymer and manufactured by an extrusion process followed by a drawing process where the extruded diameter is between 1.1 and 1.4 times the diameter of the finished line after drawing.

23 Claims, 2 Drawing Sheets

FISHING LINE TEST DATA

| | (1) Brand | (2) Diameter (Inches) | (3) Ultimate Breaking Strength (psi) | (4) Ultimate Elongation (%) | (5) Ultimate Knot Breaking Strength (psi) | (6) Breaking Toughness (in-lbs per in3) | (7) Flexibility Stiffness (psi) |
|---|---|---|---|---|---|---|---|
| | \multicolumn{7}{Fishing Lines According to the Present Invention - Rows (A) through (C)} | | | | | | |
| (A) | Enhance Line 2A 6X | 0.0050 | 163,688 | 31.426 | 133,639 | 26,459 | 350,936 |
| (B) | Enhanced Line 2A 4X | 0.0071 | 154,628 | 33.579 | 130,269 | 26,163 | 312,690 |
| (C) | Enhanced Line PP 4X | 0.0070 | 159,311 | 30.000 | 141,356 | 24,278 | 438,618 |
| | Prior Art Fishing Lines - Rows (D) through (M) | | | | | | |
| (D) | Climax 6X | 0.0051 | 134,501 | 24.549 | 117,027 | 20,855 | 939,609 |
| (E) | Climax 4X | 0.0071 | 144,196 | 30.385 | 118,307 | 25,788 | 627,401 |
| (F) | Dai-Riki 6X | 0.0049 | 153,942 | 20.023 | 113,508 | 20,985 | 1,145,361 |
| (G) | Dai-Riki 4X | 0.0070 | 158,245 | 24.099 | 138,215 | 23,131 | 116,293 |
| (H) | Rio 8X | 0.0032 | 177,978 | 15.857 | 147,566 | 19,931 | 1,018,848 |
| (I) | Rio 4X | 0.0072 | 161,120 | 24.613 | 121,749 | 21,829 | 816,406 |
| (J) | Umpqua 6X | 0.0055 | 161,291 | 20.852 | 141,593 | 19,124 | 1,246,772 |
| (K) | Umpqua 4X | 0.0070 | 148,631 | 22.124 | 127,376 | 18,589 | 968,182 |
| (L) | Orvis 6X | 0.0052 | 161,980 | 16.428 | 129,961 | 16,673 | 1,278,890 |
| (M) | Orvis 4X | 0.0071 | 157,179 | 24.484 | 136,947 | 20,821 | 679,432 |

FIGURE 1

FISHING LINE TEST DATA

| | (1) Brand | (2) Diameter (Inches) | (3) Ultimate Breaking Strength (psi) | (4) Ultimate Elongation (%) | (5) Ultimate Knot Breaking Strength (psi) |
|---|---|---|---|---|---|
| | | | Fishing Lines According to the Present Invention - Rows (A) through (C) | | |
| (A) | Enhance Line 2A 6X | 0.0050 | 163,688 | 31.426 | 133,639 |
| (B) | Enhanced Line 2A 4X | 0.0071 | 154,628 | 33.579 | 130,269 |
| (C) | Enhanced Line PP 4X | 0.0070 | 159,311 | 30.000 | 141,356 |
| | | | Prior Art Fishing Lines - Rows (D) through (M) | | |
| (D) | Climax 6X | 0.0051 | 134,501 | 24.549 | 117,027 |
| (E) | Climax 4X | 0.0071 | 144,196 | 30.385 | 118,307 |
| (F) | Dai-Riki 6X | 0.0049 | 153,942 | 20.023 | 113,508 |
| (G) | Dai-Riki 4X | 0.0070 | 158,245 | 24.099 | 138,215 |
| (H) | Rio 8X | 0.0032 | 177,978 | 15.857 | 147,566 |
| (I) | Rio 4X | 0.0072 | 161,120 | 24.613 | 121,749 |
| (J) | Umpqua 6X | 0.0055 | 161,291 | 20.852 | 141,593 |
| (K) | Umpqua 4X | 0.0070 | 148,631 | 22.124 | 127,376 |
| (L) | Orvis 6X | 0.0052 | 161,980 | 16.428 | 129,961 |
| (M) | Orvis 4X | 0.0071 | 157,179 | 24.484 | 136,947 |

FIGURE 1
FISHING LINE TEST DATA

| Breaking Toughness (in-lbs per in3) (6) | Flexibility Stiffness (psi) (7) |
|---|---|
| 26,459 | 350,936 |
| 26,163 | 312,690 |
| 24,278 | 438,618 |
| 20,855 | 939,609 |
| 25,788 | 627,401 |
| 20,985 | 1,145,361 |
| 23,131 | 116,293 |
| 19,931 | 1,018,848 |
| 21,829 | 816,406 |
| 19,124 | 1,246,772 |
| 18,589 | 968,182 |
| 16,673 | 1,278,890 |
| 20,821 | 679,432 |

FISHING LINE WITH ENHANCED PROPERTIES

This utility patent application claims the benefit of provisional application No. 60/267,311, filed Feb. 8, 2001.

BACKGROUND OF THE INVENTION

1. Field of the Invention

The present invention generally relates to lines, leaders, tippet material, or tapered leaders (for sake of brevity hereinafter called "fishing line or lines"), used in various types of fishing applications and, more particularly, is concerned with an enhanced fishing line having a unique combination of properties in terms of breaking strength, elongation, knot breaking strength, breaking toughness, and flexibility stiffness.

2. Description of the Prior Art

Synthetic monofilament fishing lines, comprised of synthetic polymeric materials such as polyamides, polyesters, polyethylenes, or fluoropolymers, have long been used in fishing applications. The synthetic monofilament fishing lines employed in the prior art have traditionally attempted to achieve the highest possible breaking strength with the smallest possible diameter. The objective of creating fishing lines with the smallest possible diameter is to make the fishing line as inconspicuous as possible so as to increase the potential for attracting the fish to the bait or fly, while also providing as high a strength as possible in order to hook-up and land the larger fish.

This traditional way of making fishing lines has several disadvantages associated with it that have not yet been overcome in the design and construction of fishing lines. Due to the nature of the polymeric materials used to make the monofilament fishing lines, the material becomes increasingly stiffer in order to achieve a high ultimate breaking strength. The stiffness of the material is related to its elongation, or the ratio of the extension of the material to the initial length of the material prior to stretching. The increased stiffness of the material results in the line becoming less flexible which tends to make tying knots in the line more difficult and also tends to dramatically reduce the breaking strength of the line at the knot.

In addition, stiffer, stronger lines have less capacity to resist shock or rapid impact loading conditions before breaking, such as when a fish is hooked-up and rapidly swims in a direction away from the rod and reel to place a rapid loading on the line. The capacity to resist rapid loading conditions is referred to as the breaking toughness of the line. Lines that have a high breaking strength will generally have a lower ultimate elongation and a correspondingly low breaking toughness. The lower breaking toughness is what causes the instantaneous breakage of the line under the rapid impact conditions. Since the line breaks almost instantaneously, the fisherman does not have ample time to react and relieve the pressure in the line by either raising the tip of the rod or allowing the line to come off the reel. Therefore, more fish are lost after the initial hook-up due to breaking of the line from these rapid loading conditions as a result of its lower breaking toughness.

By observing and studying prior art fishing lines and statements that are made with regard to the benefits of the so-called high-performance fishing lines, one concludes that current state-of-the-art practices employed to improve performance of fishing lines primarily involve making fishing lines that have higher ultimate breaking strength and correspondingly thinner diameters. The apparent intent is to achieve a higher ultimate knot breaking strength while the critical property of breaking toughness is ignored.

Tests conducted on prior art fishing lines demonstrate this assertion. The so-called high performance fishing lines do generally have higher ultimate breaking strength and thinner diameters. However, there is generally only a marginal benefit, if any, in terms of a higher ultimate knot breaking strength. They also have relatively lower ultimate elongation, significantly lower breaking toughness and significantly less flexibility by virtue of their higher flexibility stiffness.

The test equipment used to measure the aforesaid properties of fishing lines is a conventional universal testing machine, such as those under the Instron name, and the tests are conducted in accordance with test procedures outlined in ASTM D-2101-91 where a constant rate of extension of ten inches per minute and a specimen gauge length of 10 inches were used.

As referred to herein, the various properties are defined as follows. The Ultimate Breaking Strength is defined as the force required to break the line divided by its cross sectional area, whose value is presented with units of pounds per square inch (also referred to as psi herein). The Ultimate Knot Breaking Strength is defined as the force required to break the line divided by its cross sectional area, with an overhand knot tied into the line, whose value is presented with units of pounds per square inch. The Ultimate Elongation is defined as the ratio of the extension of a material at the breaking point, to the length of the material prior to stretching, whose value is presented as a percentage. The Breaking Toughness is defined as the actual work per unit volume of material that is required to break the material, whose value is presented with units of inch-pounds per cubic inch. The Flexibility Stiffness is defined as the stiffness of the material measured between 5% and 10% elongation and is determined by subtracting the stress in the monofilament at which 5% elongation is achieved from the stress in the monofilament at which 10% elongation is achieved, and dividing this difference by the 5% difference in elongation. The lower the Flexibility Stiffness, the more flexible the monofilament.

Due to the adverse effects on performance from the tradeoffs associated with prior art fishing lines, there exists a need for an enhanced fishing line having a unique combination of the aforementioned properties which improves performance.

SUMMARY OF THE INVENTION

The present invention provides an enhanced fishing line designed to satisfy the aforementioned need. The enhanced fishing line of the present invention is adapted for use in various types of fishing applications and provides a product having superior properties over those presently on the market which improves performance. In particular, the enhanced fishing line of the present invention has a unique combination of ultimate breaking strength and ultimate elongation properties so as to provide a fishing line with a significantly higher breaking toughness and with an optimal ultimate knot breaking strength, and lower flexibility stiffness, so as to provide a fishing line with significantly higher performance.

Accordingly, the present invention is directed to a fishing line which comprises: (a) a monofilament made of a polymer, such as a polyamide, such as nylon 6, nylon 66, nylon 612, nylon 11, and nylon 12; or a fluoropolymer, such as polyvinylidene fluoride; or a polyolephine, such as polypropylene; (b) the monofilament having an ultimate breaking strength of a minimum of about 150,000 psi, an ultimate elongation of a minimum of about 30%, an ultimate knot breaking strength of a minimum of about 130,000 psi, a breaking toughness of a minimum of about 25,000 inch-pounds per cubic inch, and a flexibility stiffness of no greater than about 500,000 pounds per square inch.

More particularly, the monofilament has a diameter of between about 0.003 inches to 0.045 inches, and is manufactured by an extrusion process followed by a drawing process, such that the monofilament has an extruded diameter between about 1.1 and 1.4 times the finished diameter after drawing.

Further, the ultimate breaking strength of the monofilament is within a range of about 150,000 to 180,000 psi. The ultimate elongation of the monofilament is within a range of about 30% to 100%. The ultimate knot breaking strength of the monofilament is within a range of about 130,000 to 170,000 psi. The breaking toughness of the monofilament is within a range of about 25,000 to 35,000 inch-pounds per cubic inch. Also, the monofilament has a flexibility stiffness of about 225,000 to 500,000 pounds per square inch.

These and other features and advantages of the present invention will become apparent to those skilled in the art upon a reading of the following detailed description of the invention.

DETAILED DESCRIPTION OF THE INVENTION

The enhance fishing line of the present invention is a monofilament made of a polymer, preferably a polyamide, such as nylon 6, nylon 66, nylon 612, nylon 11, and nylon 12; or a fluoropolymer, such as polyvinylidene fluoride; or a polyolephine, such as polypropylene. The monofilament has a finished diameter of between about 0.003 inches to 0.045 inches.

The monofilament preferably is made by an extrusion process, followed by a drawing process where the extruded diameter is between 1.1 and 1.4 times the diameter of the finished monofilament after stretching or drawing. Specifically, in a set of representative examples, a quantity of the polymer, as described above, is extruded using conventional extruding equipment to provide an extruded monofilament of between 1.1 and 1.4 times the finished diameter of the monofilament. The extruded monofilament is then subjected to a drawing process where the monofilament is stretched out along its length and results in a corresponding reduction in the diameter of the monofilament until the finished diameter is achieved. The drawing process aligns the molecular chains in a direction parallel to the long axis of the monofilament thereby increasing the ultimate breaking strength of the material along with its stiffness. After the drawing process, the monofilament is heat treated to relieve the high stresses, which can exist near the surface of the monofilament as a result of the drawing process. This heat treatment subjects the monofilament to a temperature range of between 40 and 150 degrees Celsius for a time period of between 30 minutes and 4 hrs. After heat treating the monofilament can further be subjected to an irradiation process, wherein the monofilament is exposed to gamma irradiation or electron beam to achieve an accumulation of 0.5 to 100 mega rads of exposure. The irradiation process promotes cross linkage of the molecules and results in lower flexibility stiffness and greater ultimate elongation while maintaining a high ultimate breaking strength.

The aforementioned extrusion, drawing, treatment processes are set to instill the enhanced fishing line with a unique combination of properties which include the following. The enhanced fishing line will generally have a minimum ultimate breaking strength of 150,000 psi (pounds per square inch) or within a range of about 150,000 to 180,000 psi, a minimum ultimate elongation of 30% or within a range of about 30% to 100%, a minimum ultimate knot breaking strength of 130,000 psi or within a range of about 130,000 to 170,000 psi, a minimum breaking toughness of 25,000 inch-pounds per cubic inch or within a range of about 25,000 to 35,000 inch-pounds per cubic inch, and a flexibility stiffness of no more than 500,000 psi or within a range of about 225,000 to 500,000 psi, based on averaging the test results for a total of five specimens from the same production lot being tested using a universal testing machine in accordance with test procedures outlined in ASTM D-2101-91 at a constant rate of extension of ten inches per minute and a specimen gauge length of 10 inches.

Following the aforementioned steps of the extrusion and drawing processes, samples were made of monofilament fishing line having the minimum ultimate breaking strength of 150,000 psi and the minimum ultimate elongation of 30% that resulted in the line having the ultimate knot breaking strength of more than 130,000 psi, a breaking toughness of more than 25,000 inch-pounds per cubic inch, and a flexibility stiffness of less than 500,000 psi.

FIG. 1 presents a table of Fishing Line Test Data which includes data for the enhanced monofilament fishing line samples along with data for prior art fishing line samples that were available in the market. Column (1) presents the diameter values of the fishing line samples in inches. Column (2) presents the ultimate breaking strength values of the fishing line samples in pounds per square inch. Column (3) presents the ultimate elongation values of the fishing line samples in %. Column (4) presents the ultimate knot breaking strength values of the fishing line samples in pounds per square inch. Column (5) presents the breaking toughness values of the fishing line samples in inch-pounds per cubic inch. Column (6) presents the flexibility stiffness values of the fishing line samples in pounds per square inch. Rows (A) through (C) present the test data for the enhanced fishing line samples according to the current invention. Rows (D) through (M) present the test data for typical prior art lines.

Observing the test data for the enhanced lines according to the present invention, one can readily observe that the combination of ultimate breaking strength greater than 150,000 psi and ultimate elongation greater than 30% produce levels of ultimate knot strength greater than or equal to 130,000 psi, breaking toughness greater than or equal to 25,000 in-pounds per cubic inch, and flexibility stiffness less than or equal to 500,000 psi. In the case of prior art samples such as the samples in rows (F), (G), (H), (I), (J), (L), and (M), the ultimate breaking strength is greater than 150,000 psi, however, the ultimate elongation is considerably less than 30% for each of these samples, resulting in low ultimate knot strength values of less than 130,000 psi, low breaking toughness values of less than 25,000 in-pounds per cubic inch, and flexibility stiffness greater than 500,000 psi. In the case of the prior art sample in row (E), the ultimate elongation is higher at 30.385%, however, the ultimate breaking strength is considerably less than 150,000 psi, and the ultimate knot strength is also considerably less than 130,000 psi. Therefore, one can readily observe from the data in FIG. 1 that the unique combination of high ultimate breaking strength (at least 150,000 psi) and high ultimate elongation (at least 30%) produces enhanced performance with regard to greater ultimate knot breaking strength (at least 130,000 psi), greater breaking toughness (at least 25,000 in-pounds per cubic inch) and reduced flexibility stiffness (no greater than 500,000 psi) which results in greater flexibility.

Field testing of these fishing line samples, which were made in the form of tippet material for fly fishing, has confirmed the unique, positive benefits of the improved fishing line having the unique combination of properties mentioned previously. The additional benefit of increased flexibility was also realized as demonstrated by the ease with which knots were able to be tied and by the natural way in which the tippet material presented the fly.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

I claim:

1. A fishing line having a reduced diameter with improved performance comprising:
    (a) a monofilament made of a polymeric material;
    (b) said monofilament having an ultimate breaking strength of a minimum of 150,000 psi coupled with an ultimate elongation of a minimum of 30 percent such that when an overhead knot is tied into said line said monofilament has an ultimate knot breaking strength of a minimum of 130,000 psi so as to increase the likelihood of maintaining and landing a fish hooked on said line.

2. The line as recited in claim 1, wherein said polymeric material is one selected from the group of polymers consisting of polyamides, fluoropolymers, and polyolephines.

3. The line as recited in claim 2, wherein said polyamide is one selected from the group of polyamides consisting of nylon 6, nylon 66, nylon 612, nylon 11, and nylon 12.

4. The line as recited in claim 2, wherein said polyolephine is polypropylene.

5. A fishing line comprising:
    (a) a monofilament made of a fluoropolymer;
    (b) said monofilament having an ultimate breaking strength of a minimum of 150,000 psi coupled with an ultimate elongation of a minimum of 30 percent such that when an overhead knot is tied into said line said monofilament has an ultimate knot breaking strength of a minimum of 130,000 psi so as to increase the likelihood of maintaining and landing a fish hooked on said line.

6. The line as recited in claim 5, wherein said ultimate knot breaking strength of said monofilament is within a range of about 130,000 to 170,000 psi.

7. The line as recited in claim 5, wherein said monofilament further having a breaking toughness of a minimum of 25,000 inch-pounds per cubic inch so as to reduce the likelihood of losing a hooked fish due to breakage of said line caused by rapid shock loading on said line by said fish.

8. The line as recited in claim 7, wherein said breaking toughness of said monofilament is within a range of about 25,000 to 35,000 inch-pounds per cubic inch.

9. The line as recited in claim 5, wherein said monofilament further having a flexibility stiffness of no greater than 500,000 psi so as to facilitate the tying of a knot in said line and to increase the likelihood of hooking a fish by presenting bait on said line in a more natural way.

10. The line as recited in claim 9, wherein said monofilament has a flexibility stiffness of about 225,000 to 500,000 pounds per square inch.

11. The line as recited in claim 5, wherein said monofilament further having a finished diameter of between 0.003 inch to 0.045 inch.

12. The line as recited in claim 5, wherein said ultimate breaking strength of said monofilament is within a range of 150,000 to 180,000 psi.

13. The line as recited in claim 5, wherein said ultimate elongation of said monofilament is within a range of 30 percent to 100 percent.

14. The line as recited in claim 5, wherein said fluoropolymer is polyvinylidene fluoride.

15. A fishing line having a reduced diameter with improved performance comprising:
    (a) a monofilament made of a polymeric material and having a finished diameter of between 0.003 inch to 0.045 inch for being as inconspicuous as possible so as to increase the potential for attracting fish;
    (b) said monofilament having an ultimate breaking strength of a minimum of 150,000 psi coupled with an ultimate elongation of a minimum of 30 percent, such that when an overhead knot is tied into said fishing line said line has an ultimate knot breaking strength of a minimum of 130,000 psi so as to increase the likelihood of maintaining and landing a fish hooked on said line.

16. The line as recited in claim 15, wherein said monofilament further having a breaking toughness of a minimum of 25,000 inch-pounds per cubic inch so as to reduce the likelihood of losing a hooked fish due to breakage of said line caused by rapid shock loading on said line by said fish.

17. The line as recited in claim 15, wherein said monofilament further having a flexibility stiffness of no greater than 500,000 psi so as to facilitate the tying of a knot in said line and to increase the likelihood of hooking a fish by presenting bait on said line in a more natural way.

18. A fishing line with enhanced properties for improved performance, said fishing line having:
    (a) a flexibility stiffness of no greater than 500,000 psi so as to facilitate the tying of a knot in said line and to increase the likelihood of hooking a fish by presenting bait on said line in a more natural way;
    (b) a breaking toughness of a minimum of 25,000 in-lbs per cubic inch so as to reduce the likelihood of losing a hooked fish due to breakage of said line caused by rapid shock loading on said line by the fish; and
    (c) an ultimate breaking strength of a minimum of 150,000 psi coupled with an ultimate elongation of a minimum of 30 percent such that when an overhead knot is tied into said fishing line said line has an ultimate knot breaking strength of a minimum of 130,000 psi so as to increase the likelihood of maintaining and landing a fish hooked on said line.

19. The line as recited in claim 18, wherein said ultimate breaking strength of said line is within a range of 150,000 to 180,000 psi.

20. The line as recited in claim 18, wherein said ultimate elongation of said line is within a range of 30 percent to 100 percent.

21. The line as recited in claim 18, wherein said ultimate knot breaking strength of said line is within a range of 130,000 to 170,000 psi.

22. The line as recited in claim 18, wherein said breaking toughness of said line is within a range of 25,000 to 35,000 in-pounds per cubic inch.

23. The line as recited in claim 18, wherein said flexibility stiffness of said line is within a range of 225,000 to 500,000 psi.

* * * * *